United States Patent [19]

Kimball et al.

[11] Patent Number: 4,603,587
[45] Date of Patent: Aug. 5, 1986

[54] HIGH PRODUCTIVITY VIBRATION TEST FIXTURE SUITED FOR TESTING PRINTED CIRCUIT BOARDS

[75] Inventors: David V. Kimball, Monrovia; Charles W. Frost, La Verne, both of Calif.

[73] Assignee: Kimball Industries, Inc., Monrovia, Calif.

[21] Appl. No.: 702,949

[22] Filed: Feb. 19, 1985

[51] Int. Cl.⁴ .......................................... G01N 29/00
[52] U.S. Cl. .................................................. 73/663
[58] Field of Search ................. 73/663, 665, 572, 577, 73/856, 857, 859, 860

[56] References Cited

U.S. PATENT DOCUMENTS 2,702,929  3/1955  Laddon et al. ................. 73/859

FOREIGN PATENT DOCUMENTS 503740  4/1939  United Kingdom ............... 73/860

Primary Examiner—Anthony V. Ciarlante
Attorney, Agent, or Firm—Louis J. Bachand

[57] ABSTRACT

Vibration fixture apparatus and method of use for high volume testing of circuit boards and the like is provided comprising a frame peripherially surrounding the board and a shimming structure which is hydraulically actuated to bind against the board and frame selectively for faithful transmission of vibration energy from a vibration source through the frame to the board to be tested.

19 Claims, 5 Drawing Figures

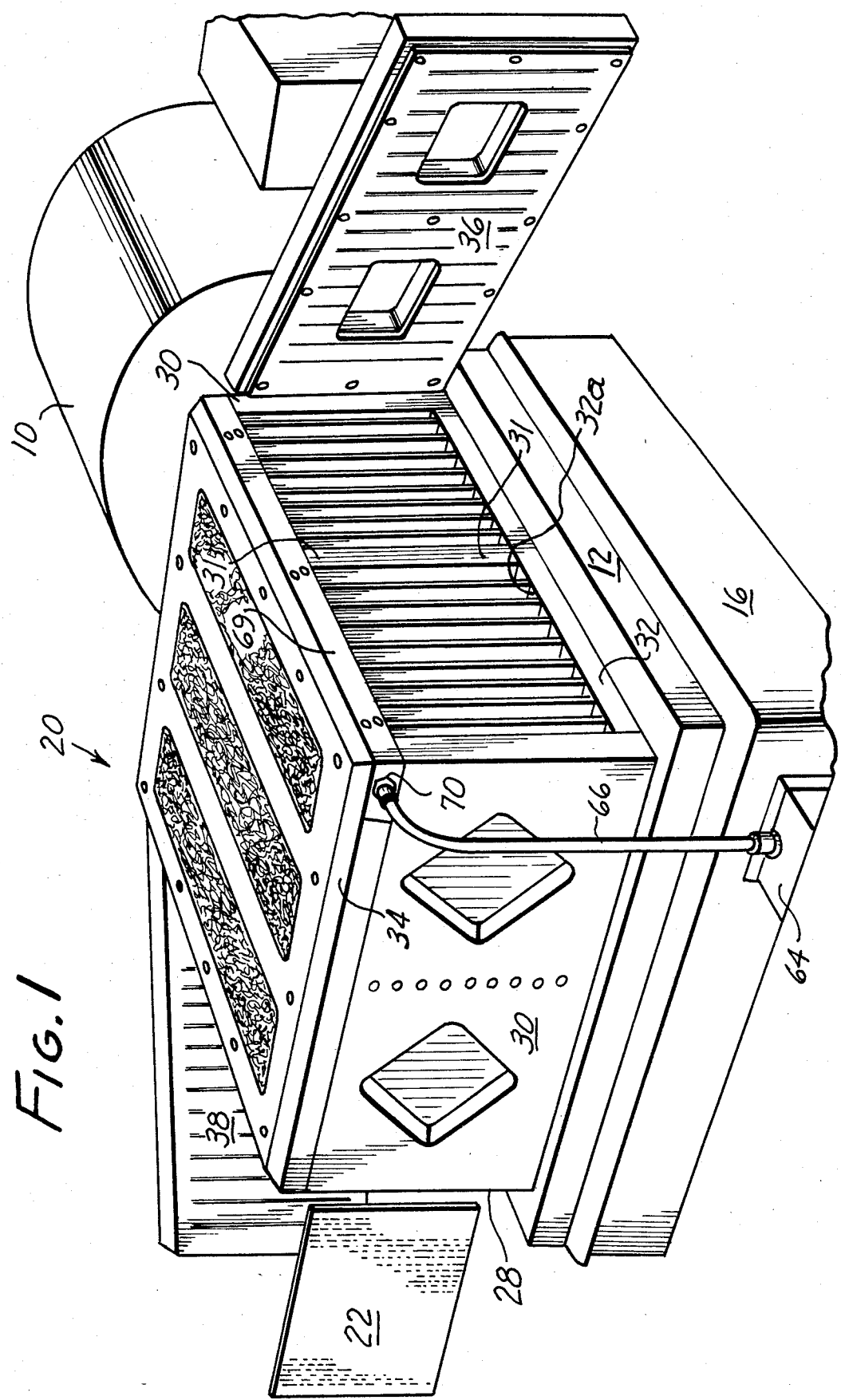

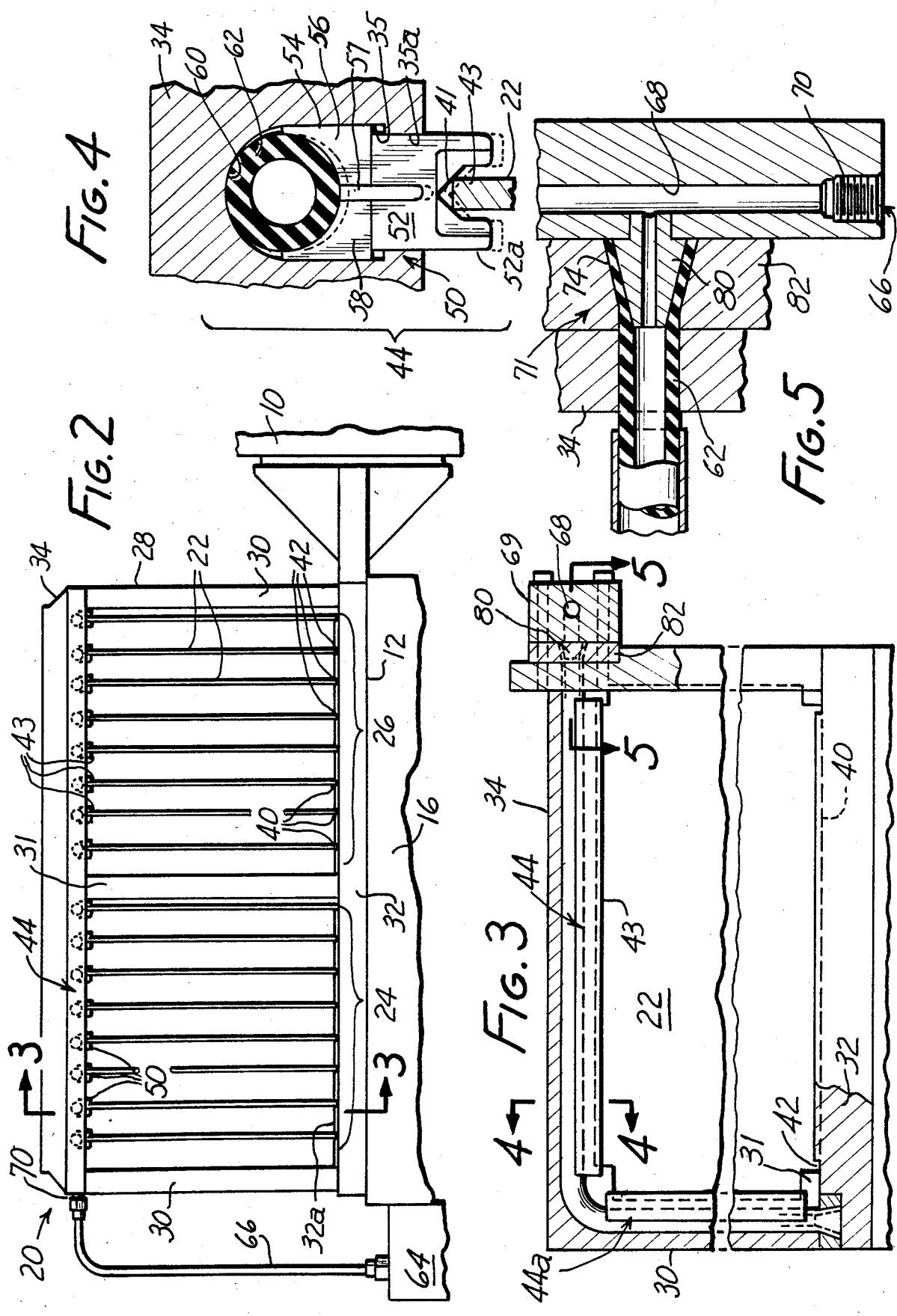

4,603,587

HIGH PRODUCTIVITY VIBRATION TEST FIXTURE SUITED FOR TESTING PRINTED CIRCUIT BOARDS

This invention has to do with vibration fixtures. More particularly, the invention is concerned with vibration fixtures which are suited to high speed, low cost testing of thin or at least narrow-edged workpieces such as printed circuit boards, singly or in multiples, and with the use of largely unskilled labor for maximum productivity and economical processing of large volumes of parts. It is a signal feature of the invention that faithful transmittal of vibration input to the workpiece is obtained on a consistent basis independent of the presence or absence of a full complement of workpieces in the fixture.

TECHNICAL FIELD

The reliability of electronic and mechanical assemblies for severe use environments has long been tested by subjecting the assemblies to a prescribed regimen of vibration. Typically the electronic and/or mechanical assembly or like workpiece is secured to a jig commonly termed a vibration fixture, which in turn is secured to an electrodynamic shaker-driven slip plate to be vibrated in predetermined directional patterns with predetermined energy inputs while the slip plate is supported on a bearing surface such as oil-lubricated granite. For accuracy in testing, faithful replication of the input energy to the workpiece is essential, and thus vibration fixtures have been very rigid, lightweight structures to which the workpiece can be rigidly bolted.

SUMMARY OF THE INVENTION

New test requirements, for printed circuit boards for example, have posed new challenges. Unlike previous assemblies typically tested, circuit boards are rigid in only the edgewise direction, and flexure such as a bowing caused by too tightly pressing the board can destroy the workpiece rather than test it. Similarly, the volume of boards to be tested is so great that the usual modes of attachment, i.e. a series of bolts to be taken on and off with each test of each workpiece, is impractical, particularly when the criticality of each adjustment to faithful energy transmission is borne in mind.

For economy, it is highly desirable to test batches of boards at one time, since these are lightweight components, of relatively small value and are commonly generated by the thousands in highly automated manufacturing operations. Batch testing imposes additional requirements, however, in that each board must be properly secured for faithful transmission of vibration energy and such proper securement cannot depend on whether or not each position on a multiple testing position fixture is occupied since there are greater and smaller batches and a vibration fixture needs to accommodate both sizes without vibration energy input differentiation.

SUMMARY OF THE INVENTION

Accordingly it is an object of the present invention to provide vibration test fixtures and method of testing printed circuit boards and like workpieces having a narrow edge or mounted to have a narrow edge wherein multiple or single workpieces can be tested, the vibration energy imparted to each and all is uniform and truly faithful to the energy input, loading and unloading is easy, locking up to the proper rigidity is automatic, free of the possibility of overloading the circuit boards and operator error proof so that unskilled labor can be used, and the fixture operates the same whether fully or partly loaded.

These and other objects of the invention to become apparent hereinafter are realized in a vibration fixture for high volume, unskilled labor testing of printed circuit boards or any like peripherally narrow workpiece, the fixture comprising a workpiece support frame for relatively loosely peripherally supporting the workpiece in a first assembled relation for ease of mounting and demounting the workpiece to and from the frame, workpiece shimming structure selectively shiftable relative to the frame for relatively tightly peripherally supporting the workpiece in a second rigidly assembled relation for faithful transmitting of vibration energy to the workpiece; and means for coupling the fixture to a source of vibration such as an electrodynamic shaker and slip plate combination.

In particular embodiments, the support frame comprises a metal frame generally congruent with the workpiece; the frame and workpiece lie in a common plane in their first and second assembled relations; the frame is slotted to edgewise receive at least two edges of the workpiece; at least two of the received workpiece edges are contiguous; and the workpiece shimming structure comprises a shimming body, the frame having one portion shiftably receiving the shimming body and another cooperating portion opposite the one portion across the workpiece, and means to shift the shimming body relative to the one frame portion, the shifting means comprising an hydraulic actuator selectively shifting the shimming body against the workpiece in workpiece wedging relation against the cooperating frame portion for faithful vibration transmission.

In the last mentioned and like embodiments, the shimming body has a first portion defining a workpiece engaging head, and an integral second portion slidably received by the one frame portion, the second portion being adapted to bind against the one frame portion in shifted relation of the shimming body for faithful transmission of vibration energy between the frame and the shimming body; the one frame portion defines a shimming body receiving bore, the body second portion being tail split for wedging into the one frame portion bore for faithful vibration transmission; means is also provided to wedge the shimming body split second portion apart to bind against the frame portion in faithful vibration energy trasmitting bore engaging relation; the shimming body second split portion defining a saddle below the split, and the wedging means comprising an inflatable tube on which the shimming body second portion is saddled for wedging-apart response to inflation of the tube; the shimming structure typically further including a plurality of shimming bodies, the one frame portion receiving the bodies in laterally extended relation generally coextensive with at least one side of the workpiece; the shimming structure is a first shimming structure, and including also a second shimming structure on a side of the workpiece contiguous with the one workpiece side; the hydraulic actuator comprises a fluid-inflatable tube; the one frame portion defines a channel for the tube, the shimming second portion being in engagement with the tube, whereby the shimming body is shifted relative to the frame portion by inflation of the tube, and including also a supply of inflating fluid to the tube, a connector means between the tube and the inflating fluid supply, the connector means comprising a block defining a tapered bore, and an annular plug congruent with the bore, the plug being sized to endwise wedge the tube in the bore in inflating fluid passing relation, a plurality of workpieces and frames, each of the frames having a fluid inflatable tube therein, and a fluid plenum and manifold means for simultaneously communicating the fluid supply and each of the tubes in simultaneous shimming body shifting relation.

The invention further contemplates the method of vibration testing printed circuit boards and like narrow edged workpieces, including positioning the workpiece loosely within a surrounding frame, effectively reducing the inside diameter of the frame in workpiece clamping relation by selectively moving one portion of the frame relative to the other portions thereof while binding the moving and nonmoving frame portions against one another, whereby the workpiece is wedged in the frame for faithful vibration transmission, and also moving two contiguous portions of the frame by hydraulically displacing a movable part of the frame portion to effect the frame inside dimension.

THE DRAWINGS

The invention will be further described as to an illustrative embodiment in conjunction with the attached drawings in which:

FIG. 1 is a perspective view of a vibration test apparatus in which the invention test fixture is employed;

FIG. 2 is a front elevation view of the invention fixture;

FIG. 3 is a view taken on line 3—3 in FIG. 2;

FIG. 4 is a view taken on line 4—4 in FIG. 3; and,

FIG. 5 is a view taken on line 5—5 in FIG. 3.

PREFERRED MODES

With reference now to the drawings in detail, shaker 10 of conventional design is coupled to a slip plate 12 by a driver bar 14, the plate being supported by bearing surface of table 16. The shaker 10 is electrodynamically driven and drives the slip plate 12 with a vibration energy input of predetermined form, amplitude and direction adapted to test the workpiece and which must be transmitted to the workpiece faithful to these predetermined values for valid testing. Invalid testing results when there is insufficient rigidity in the coupling of the workpiece, fixture, slip plate driver bar and/or shaker. In testing circuit boards rigid coupling of the boards to the fixture is the presently limiting parameter where volume testing is to be achieved, since the requirements of extensive clamping to have rigidity appears inconsistent with rapid turnover of test pieces. The present invention, however, overcomes the difficulty by providing maximum clamping force in an easy automatic way which quickly reverses for facile turnover of test pieces.

A high volume embodiment of The vibration fixture of the invention is shown at 20, one adapted particularly to printed circuit board workpieces. Other embodiments for boards or like thin or narrow-edged workpieces may be readily envisioned from the circuit board embodiment now to be described. In all embodiments, a frame surrounds the workpiece to provide peripheral support, and a portion of the frame is dimensionally adjustable reversibly for selectively clamping and unclamping the workpiece. Additionally, in each embodiment, the dimensional adjustment is realized with a shimming structure which moves relative to the frame portion mounting it so as to wedge the workpiece against other nonmoving portions of the frame. In each embodiment, the shimming structure employs a shimming body which is adapted to bind against its mounting even as it is advanced against the workpiece, with the result in all embodiments of ultimately an entirely rigid structure before vibration begins, with no loss of vibration tranmission between frame portion and shimming body or shimming body and workpiece since each body portion interacts with the other to tightly bind the entire assembly responsive to the binding of either with its opposing object.

Returning to the illustrative embodiment, the fixture 20 is secured, as by welding, bolting or like conventional means not shown to the slip plate 12. With reference to FIGS. 1 and 2 particularly, the workpiece is illustrated to be a printed circuit board 22, left and right hand series of which are shown arrayed in spaced parallel relation at 24, 26. A like arrangement is provided in the rear of the fixture 20 whereby 32 printed circuit boards are tested with each cycle of the apparatus.

The fixture 20 comprises a rigid metal frame 28, e.g. of magnesium which may be ported as shown. The fame 28 has side walls 30, center wall 31, bottom wall 32, and top wall 34. A front opening door 36 and rear opening door 38 are provided conveniently hinged on a side wall 30 to complete the frame 28.

The upwardly facing interior surface 32a of the bottom wall 32 defines a series of parallel grooves 40 adapted to receive the lower side edges 42 of the circuit boards 22, as shown. The upper side edges 43 of the boards 22 are held at the frame top wall 34 by shimming structure 44 shown as a laterally extended array of shimming bodies kk having discontinuous grooves 41 in FIGS. 2 and 3 and to be described hereinafter in conjunction with FIG. 4, but it should be noted here that with the shimming structure retracted, cf. FIG. 4, the vertical distance between the frame top and bottom walls 32, 34 is greater than the vertical extent of boards 22 by a sufficient margin that the boards can be inserted easily without danger of bending, but also kept vertical by edges 42, 43 loose engagement with the opposed grooves 40, 41, as shown.

The shimming structure 44 is best shown in FIGS. 3 and 4. Once the boards 22 are loosely inserted between the top and bottom walls 32, 34, as shown in FIG. 2, a portion of the frame 20, here a part of top wall 34 and a contiguous side wall 30 is moved to cinch the boards tightly between the moved frame portion from top wall 34 and the opposed nonmoving frame portion, i.e. the bottom wall 32 and right side wall 30. Because the distance between loose fit and binding is small and the effect of shifting the board is a tightening, the process is referred to herein as shimming.

In the illustrated embodiment, the frame protion defined by upper wall 34 has a lateral series of downwardly opening, vertically disposed bores 35 formed with inward annular shoulders 35a at the mouth thereof, Positioned within each bore is a shimming body 50 best shown in FIG. 4 to be a stepped cylinder whereby the body in its travel toward the board 22 may finally engage the bore shoulder 35a as a stop, an assurance against undue binding force against the circuit board. The shimming body 50 is shown to comprise a first, lower portion 52 defining a workpiece- (e.g. circuit board 22) engaging head 52a having slope-sided walls to define the groove 41 to lie in the same plane as the the board edge 22a, a second, upper portion 54 integral with the first portion and having split tail segments 56, 58 defined by central kerf 57.

The series of bores 35 in the frame top wall portion 34 receive the shimming bodies 50 with a minimum mechanical clearance for the slight axial movement required for operation of the shimming structure 44. Minimum clearance ensures that vital rigid binding of the shimming body 50 and the surrounding bore 35 occurs, and that the faithful replication of the shaker vibration is sensed at the workpiece.

The shimming structure 44 further includes means to shift the shimming body selectively into the board 22 while binding the body against its surrounding bore 35 at the same time. For this purpose the top wall 34 has formed in it a channel 60 and within the channel an inflatable tube 62 is disposed. The tube 62 closely fits the channel 60, but can be inflated by gaseous or liquid fluid. In one embodiment hereof pressurized oil from supply 64 is passed along supply line 66 into the top wall 34 for purposes of inflating the tube 62. It will be noted in FIG. 5 that supply tube 66, shown schematically enters the top wall 34 at threaded inlet fitting 70. A plenum 68 formed in plenum block 69 and running substantially the length of the top wall 34 communicates with the supply tube 66 through the inlet fitting 70. A series of tube fittings 72 lead off the plenum 68, each tube fitting receiving the terminus 74 of a tube 62. The need for integrity of fluid fittings in the severe vibration environment contemplated for the present apparatus has prompted the development of a suitable fitting arrangement shown at 71 in the drawings. Specifically, the tube terminus 74 is wedged over an annular plug 80 and the assembly wedged into a block 82 having a congruent conical bore, and the entire assembly 71 secured to top wall 34. The plenum 68 runs along one side of the top wall 34 and communicates all tube fittings 72 with each other whereby pressurizing of the plenum immediately pressurizes, i.e. inflates all tubes 62 simultaneously.

The inflated tubes 62 it will be noted from FIG. 4, expand, shifting the shimming body 50 outward against the board edge 43. See the dotted lines in FIG. 4. The board 22 itself shifts then against the opposite frame walls wedging itself tightly under the force of the shimming body so that vibration input will not be lost between the board and the fixture frame 20.

It is still possible for energy input to be lost at the interface of the shimming body 50 and the surrounding bore, so to avoid that loss, the present apparatus provides for simultaneous binding of the body 50 with the bore 35 as the borad binds in the frame 20. This is achieved by the wedging apart of the body tails 56, 58 and the widening of the kerf 57 under the force of the inflating tube 62. See FIG. 4 where the entry of the inflated tube into the saddle 90 defined by the tails 56, 58 is depicted with a resulting closure of the mechanical clearance usually there as described above. In tests it has been shown that the binding of the shimming body 52 to the surrounding bore 35 is sufficient to rigidify the assembly for faithful vibration transmission between the frame of the fixture and the workpiece circuit board.

The reversal of the applied forces is as easy and remarkable as the application thereof. The fluid pressure is merely discontinued by the operator. The shimming body 50 returns to its original retracted position, the board 22 is loosened thereby and can be removed readily by the operator.

It is further noteworthy that the present apparatus is independent of the presence or absence of a full complement of boards in the frame. If a board is missing from a position, the rigidity of the apparatus in test is unaffected. The shimming body 50 merely goes to its stop shoulder 35a and there is no change in operation or result, making the present apparatus a highly flexible unit for production testing of less than full complements of boards.

For many applications it will be desirable to shift the boards 22 from two contiguous walls of the frame and such an arrangement is shown in FIG. 3 of the drawings where left side wall 30 has shimming structure 44a identical to structure 44 just described except for being vertically rather than horizontally oriented so as to shift the boards 22 rightward as the top wall structure shifts the boards downward.

We claim:

1. Vibration fixture for high volume, unskilled labor testing of printed circuit boards or any like peripherally narrow workpiece, said fixture comprising a frame having opposing portions and generally congruent with said workpiece and adapted to relatively loosely peripherally support said workpiece in a first assembled relation for ease of mounting or demounting said workpiece to and from the frame, and workpiece shimming structure comprising a shimming body received by said one portion of said frame and inflatable means acting between said one frame portion and said shimming body whereby said shimming structure is selectively shiftable relative to an opposing portion of said frame for relatively tightly peripherally supporting said workpiece in a second rigid assembled relation for faithful transmitting of vibration energy to the workpiece in the inflated condition of said inflatable means.

2. Vibration fixture according to claim 1, in which said frame comprises a metal frame.

3. Vibration fixture according to claim 1, in which said frame and workpiece lie in a common plane in their first and second assembled relations.

4. Vibration fixture according to claim 1, in which said frame is slotted to edgewise receive at least two edges of said workpiece.

5. Vibration fixture according to claim 4, in which at least two of said received workpiece edges are contiguous.

6. Vibration fixture according to claim 1, in which said workpiece shimming structure comprises a shimming body, said frame having one portion shiftably receiving said shimming body and another cooperating portion opposite said one portion across said workpiece, and means to shift said shimming body relative to said one frame portion, said shifting means comprising an hydraulic actuator selectively shifting said shimming body against said workpiece in workpiece wedging relation against said cooperating frame portion for faithful vibration transmission.

7. Vibration fixture according to claim 6, in which said shimming body has a first portion defining a workpiece engaging head, and an integral second portion slidably received by said one frame portion, said second portion being adapted to bind against said one frame portion in shifted relation of said shimming body for faithful transmission of vibration energy between said frame and said shimming body.

8. Vibration fixture according to claim 7, in which said one frame portion defines a shimming body receiving bore, said body second portion being tail split for wedging into said one frame portion bore for faithful vibration transmission.

9. Vibration fixture according to claim 8, including also means to wedge said shimming body split second portion apart to bind against said frame portion in faithful vibration energy transmitting bore engaging relation.

10. Vibration fixture according to claim 7, in which said shimming structure is a first shimming structure, and including also a second shimming structure on a side of said workpiece contiguous with said one workpiece side.

11. Vibration fixture according to claim 7, in which said hydraulic actuator comprises a fluid-inflatable tube.

12. Vibration fixture according to claim 11, in which said one frame portion defines a channel for said tube, said shimming second portion being in engagement with said tube, whereby said shimming body is shifted relative to said frame portion by inflation of said tube.

13. Vibration fixture according to claim 12, including also a supply of inflating fluid to said tube.

14. Vibration fixture according to claim 13, including also a connector means between said tube and said inflating fluid supply, said connector means comprising a block defining a tapered bore, and an annular plug congruent with said bore, said plug being sized to endwise wedge said tube in said bore in inflating fluid passing relation.

15. Vibration fixture according to claim 14, including also a plurality of workpieces and frames, each of said frames having a fluid inflatable tube therein, a fluid plenum and manifold means for simultaneously communicating said fluid supply and each of said tubes in simultaneous shimming body shifting relation.

16. Vibration fixture according to claim 6, in which said shimming structure includes a plurality of shimming bodies, said one frame portion receiving said bodies in laterally extended relation generally coextensive with at least one side of said workpiece.

17. Vibration fixture for high volume, unskilled labor testing of printed circuit boards or any like peripherally narrow workpiece, said fixture comprising a workpiece support frame having opposing portions generally congruent with said workpiece and adapted to relatively loosely peripherally support said workpiece in a first assembled relation for ease of mounting or demounting said workpiece to and from the frame, and workpiece shimming structure comprising a shimming body, said shimming body having a first portion defining a workpiece engaging head, and an integral second portion slidably received by a shimming body receiving bore defined by said frame portion, said shimming body second portion being tail split and defining a saddle below said split for wedging into said receiving bore, and means comprising an inflatable tube on which said shimming body second portion is saddled for wedging apart-response to inflation of said tube, whereby said shimming structure is selectively shiftable relative to an opposing portion of said frame for relatively tightly peripherally supporting said workpiece in a second rigid assembled relation for faithful transmitting of vibration energy to the workpiece in the inflated condition of said inflatable tube; and means for coupling said fixture to a source of vibration.

18. Method of vibration testing printed circuit boards and like narrow edged workpieces, including positioning said workpiece loosely within a surrounding frame having a bore, effectively reducing the inside dimensions of the frame in workpiece clamping relation by inflating a tube within said frame bore operatively coupled to the workpiece and limiting the workpiece clamping by confining the tube within the frame bore whereby said workpiece is wedged in the frame for faithful vibration transmission.

19. Method according to claim 18, including also moving two contiguous portions of said frame by hydraulically displacing a movable part of the frame portion to effect said frame inside dimension.

* * * * *